(12) United States Patent
Post (10) Patent No.: US 12,216,277 B2
(45) Date of Patent: Feb. 4, 2025

(54) OPTICAL ELEMENT FOR DECONVOLUTION

(71) Applicant: Samsung Electronics Co., Ltd., Suwon-si (KR)

(72) Inventor: Ernest Rehmatulla Post, San Francisco, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 43 days.

(21) Appl. No.: 17/963,609

(22) Filed: Oct. 11, 2022

(65) Prior Publication Data

US 2023/0119549 A1    Apr. 20, 2023

Related U.S. Application Data

(60) Provisional application No. 63/255,819, filed on Oct. 14, 2021.

(51) Int. Cl.
*G02B 27/00*  (2006.01)
*G06T 5/20*  (2006.01)
(Continued)

(52) U.S. Cl.
CPC ............ *G02B 27/0068* (2013.01); *G06T 5/20* (2013.01); *G06T 5/73* (2024.01); *H04N 23/53* (2023.01);
(Continued)

(58) Field of Classification Search
CPC .... G02B 27/0068; G02B 26/06; H04N 23/53; H04N 23/55; H04N 23/95; G06T 5/73;
(Continued)

(56) References Cited

U.S. PATENT DOCUMENTS

| 3,971,065 A | 7/1976 | Bayer |
| 6,454,414 B1 | 9/2002 | Ting |

(Continued)

FOREIGN PATENT DOCUMENTS

| CN | 101414094 A | 4/2009 |
| CN | 112202991 A | 1/2021 |

(Continued)

OTHER PUBLICATIONS

Notice of Allowance in U.S. Appl. No. 17/380,995, Dec. 21, 2022.
(Continued)

*Primary Examiner* — Marly S Camargo (57) ABSTRACT

In one embodiment, a method of constructing a corrective phase mask for an optical element, includes propagating, for each of one or more wavelengths, a point source field from an object plane to a corrective mask plane to determine a source field and propagating, for each of the one or more wavelengths, the point source field from an image plane to the corrective mask plane to determine an image field. The method may further include determining, for each of the one or more wavelengths, a phase modulation field based on the source field and the image field; and determining a multi-wavelength phase modulation field based on combining the phase modulation field for each of the one or more wavelengths.

20 Claims, 5 Drawing Sheets

(51) Int. Cl.
  *G06T 5/73* (2024.01)
  *H04N 23/53* (2023.01)
  *H04N 23/55* (2023.01)
  *H04N 23/95* (2023.01)

(52) U.S. Cl.
  CPC ............ *G06T 2207/20021* (2013.01); *G06T 2207/20212* (2013.01)

(58) Field of Classification Search
  CPC ............ G06T 5/20; G06T 2207/20021; G06T 2207/20212
  See application file for complete search history.

(56) References Cited

U.S. PATENT DOCUMENTS

| | | | |
|---|---|---|---|
| 7,053,613 B2 | 5/2006 | Lin | |
| 8,041,142 B2 | 10/2011 | Schafer | |
| 8,433,152 B2 | 4/2013 | Watanabe | |
| 8,582,911 B2 | 11/2013 | Kim | |
| 8,587,703 B2 | 11/2013 | Lelescu | |
| 9,220,481 B2 | 12/2015 | Park | |
| 9,338,354 B2 | 5/2016 | Hong | |
| 9,582,862 B2 | 2/2017 | Zhang | |
| 9,654,707 B2 | 5/2017 | Oniki | |
| 9,911,208 B2 | 3/2018 | Zhou | |
| 9,916,656 B2 | 3/2018 | Choi | |
| 9,947,901 B2 | 4/2018 | Shedletsky | |
| 9,948,849 B2 | 4/2018 | Kim | |
| 10,032,254 B2 | 7/2018 | Harmeling | |
| 10,062,153 B2 | 8/2018 | Oniki | |
| 10,083,335 B2 | 9/2018 | Zhang | |
| 10,151,933 B2 | 12/2018 | Siddiqui | |
| 10,178,381 B2 | 1/2019 | Hall | |
| 10,191,577 B2 | 1/2019 | Choi | |
| 10,217,190 B2 | 2/2019 | Liu | |
| 10,416,087 B2 | 9/2019 | Zhang | |
| 10,595,724 B2 | 3/2020 | Lai | |
| 10,642,059 B2 | 5/2020 | Soskind | |
| 10,656,437 B2 | 5/2020 | Limon | |
| 11,003,088 B2 | 5/2021 | Sorg | |
| 11,038,143 B2 | 6/2021 | Moon | |
| 11,073,712 B2 | 7/2021 | Yeke Yazdandoost | |
| 11,272,106 B1 | 3/2022 | Lee | |
| 11,575,865 B2 | 2/2023 | Liu | |
| 11,721,001 B2* | 8/2023 | Liu | .................... H04N 23/88 |
| 11,792,515 B2 | 10/2023 | Lee | |
| 2003/0002746 A1 | 1/2003 | Kusaka | |
| 2006/0103951 A1 | 5/2006 | Bell | |
| 2006/0256226 A1 | 11/2006 | Alon | |
| 2008/0013850 A1 | 1/2008 | Sakurai | |
| 2008/0068660 A1 | 3/2008 | Lace | |
| 2008/0165261 A1 | 7/2008 | Kamo | |
| 2008/0166115 A1 | 7/2008 | Sachs | |
| 2008/0218597 A1 | 9/2008 | Cho | |
| 2008/0292135 A1 | 11/2008 | Schafer | |
| 2009/0147111 A1 | 6/2009 | Litvinov | |
| 2009/0263043 A1 | 10/2009 | Cristobal | |
| 2010/0073518 A1 | 3/2010 | Yeh | |
| 2010/0188528 A1 | 7/2010 | Iwata | |
| 2011/0019056 A1 | 1/2011 | Hirsch | |
| 2011/0075257 A1 | 3/2011 | Hua | |
| 2011/0158541 A1 | 6/2011 | Watanabe | |
| 2011/0221888 A1 | 9/2011 | Choi | |
| 2011/0285680 A1 | 11/2011 | Nakamura | |
| 2012/0057072 A1 | 3/2012 | Yamashita | |
| 2012/0162490 A1 | 6/2012 | Chung | |
| 2012/0327277 A1 | 12/2012 | Myhrvold | |
| 2013/0010077 A1 | 1/2013 | Nguyen | |
| 2013/0147778 A1 | 6/2013 | Ninan | |
| 2013/0182062 A1 | 7/2013 | Son | |
| 2013/0308007 A1 | 11/2013 | Tanaka | |
| 2013/0321686 A1 | 12/2013 | Tan | |
| 2013/0336597 A1 | 12/2013 | Maeda | |
| 2014/0044314 A1 | 2/2014 | Sezer | |
| 2015/0049165 A1 | 2/2015 | Choi | |
| 2015/0101411 A1 | 4/2015 | Zalev | |
| 2015/0207962 A1 | 7/2015 | Sugimoto | |
| 2015/0338639 A1* | 11/2015 | Mtsumoto | ............ G02B 16/06 359/237 |
| 2016/0062100 A1* | 3/2016 | Cohen | .................. G02B 3/0006 348/79 |
| 2016/0180510 A1 | 6/2016 | Grau | |
| 2016/0248975 A1 | 8/2016 | Choi | |
| 2016/0277658 A1 | 9/2016 | Kim | |
| 2016/0371821 A1 | 12/2016 | Hayashi | |
| 2017/0076430 A1 | 3/2017 | Xu | |
| 2017/0104897 A1 | 4/2017 | Kang | |
| 2017/0212613 A1 | 7/2017 | Hwang | |
| 2017/0316552 A1 | 11/2017 | Hanocka | |
| 2018/0038768 A1 | 2/2018 | Hofmann | |
| 2018/0052050 A1 | 2/2018 | Menon | |
| 2018/0116500 A1 | 5/2018 | Escalier | |
| 2018/0129061 A1 | 5/2018 | Shinohara | |
| 2018/0198980 A1 | 7/2018 | Takagi | |
| 2018/0211420 A1 | 7/2018 | Yoo | |
| 2019/0212544 A1 | 7/2019 | Heber | |
| 2019/0213717 A1 | 7/2019 | Oniki | |
| 2019/0327417 A1 | 10/2019 | Moriuchi | |
| 2019/0355101 A1 | 11/2019 | Chen | |
| 2020/0159102 A1* | 5/2020 | Kouyama | ............ G03B 21/20 |
| 2020/0166807 A1 | 5/2020 | Sasaki | |
| 2020/0169725 A1 | 5/2020 | Hua | |
| 2020/0209604 A1 | 7/2020 | Chen | |
| 2020/0321561 A1 | 10/2020 | Park | |
| 2020/0389575 A1 | 12/2020 | Gove | |
| 2020/0394964 A1 | 12/2020 | Hyun | |
| 2021/0029336 A1 | 1/2021 | Liu | |
| 2021/0136335 A1* | 5/2021 | Tanaka | .................. G02B 26/06 |
| 2021/0152735 A1 | 5/2021 | Zhou | |
| 2021/0193756 A1 | 6/2021 | Oh | |
| 2021/0199952 A1 | 7/2021 | Cho | |
| 2021/0210533 A1 | 7/2021 | Cho | |
| 2021/0233976 A1 | 7/2021 | Lee | |
| 2021/0302316 A1 | 9/2021 | Walter | |
| 2022/0067889 A1 | 3/2022 | Kang | |
| 2022/0086309 A1 | 3/2022 | Kim | |
| 2022/0138924 A1 | 5/2022 | Kwon | |
| 2022/0261966 A1 | 8/2022 | Liu | |
| 2022/0277426 A1 | 9/2022 | Vyas | |
| 2022/0292637 A1 | 9/2022 | Huang | |
| 2023/0341264 A1* | 10/2023 | Houck | ................. H04N 23/955 |

FOREIGN PATENT DOCUMENTS

| | | |
|---|---|---|
| CN | 113 053 253 A | 6/2021 |
| CN | 1113 067 961 A | 7/2021 |
| CN | 108335268 B | 9/2021 |
| CN | 114331886 A | 4/2022 |
| CN | 110675347 B | 5/2022 |
| JP | 2008-070566 A | 3/2008 |
| JP | 2019-068378 A | 4/2019 |
| JP | 6652052 B9 | 2/2020 |
| KR | 101894391 B1 | 9/2018 |
| KR | 10-2022-0014764 A | 2/2022 |
| WO | WO 2010081229 A1 | 7/2010 |
| WO | WO 2016-154392 A1 | 9/2016 |
| WO | WO 2017117152 A1 | 7/2017 |
| WO | WO 2021/122471 A1 | 6/2021 |
| WO | WO 2022-005157 A1 | 1/2022 |

OTHER PUBLICATIONS

PCT Search Report and Written Opinion in PCT/KR2022/015641, Jan. 26, 2023.
International Search Report and Written Opinion for International Application No. PCT/KR2023/007313, Aug. 30, 2023.
Image Restoration for Under-Display Camera, Yuqian Zhou et al., CVPR 2021, accessed on Oct. 25, 2022 at https://openaccess.thecvf.com/CVPR2021?day=all.
Notice of Allowance in U.S. Appl. No. 17/176,535, Mar. 8, 2023.

(56) References Cited

OTHER PUBLICATIONS

Anqi Yang et al., 'Designing Display Pixel Layouts for Under-Panel Cameras', IEEE Transactions on Pattern Analysis and Machine Intelligence, vol. 43, No. 7, pp. 2245-2256, Apr. 27, 2021.
PCT Search Report and Written Decision in PCT/KR2022/011598, Nov. 16, 2022.
Final Office Action in U.S. Appl. No. 17/176,535, Nov. 7, 2022.
Levin, A. et al., "Image and Depth from a Conventional Camera with a Coded Aperture," ACM Transactions on Graphics, vol. 26, No. 3, Article 70, Publication date Jul. 2007, DOI 10.1145/1239451.1239952, http://doi.acm.org/10.1145/1239451.1239521, 9 pgs.
Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/A0.50.000H87, 0003-6935/11/340H87, © 2011 Optical Society of America, pp. H87-H115 (30 pages).
Ren, Ng, "Digital light field photography," PhD dissertation, Stanford University, Jul. 2006, 203 pgs.
Qin, Zong, et al., "See-Through Image Blurring of Transparent Organic Light-Emitting Diodes Display: Calculation Method Based on Diffraction and Analysis of Pixel Structures," Journal of Display Technology, vol. 12, No. 11, Nov. 2016, Digital Object Identifier 10.1109/JDT.2016.2594815, 1551-319X © 2016 IEEE, pp. 1242-1249 (9 pgs).
Richardson, William Hadley, "Bayesian-Based Iterative Method of Image Restoration," Journal of Optical Society of America, vol. 62, No. 1, Jan. 1972, pp. 55-59 (5 pgs).
Lucy, L. B., "An Iterative Technique for the Rectification of Observed Distributions," The Astronomical Journal, vol. 79, No. 6, Jun. 1974, © American Astronomical Society, provided by the NASA Astrophysics Data System, pp. 745-754 (10 pgs).
Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-Jul. 16, 07 DOI: http://dx.doi.org/10.1145/2897824.2925875, 15 pages.
Sitzmann, Vincent., et al., "End-to-End Optimization of Optics and Image Processing for Achromatic Extended Depth of Field and Super-Resolution Imaging," © 2018 ACM 0730-0301/2018/8-ART114, https://doi.org/10.1145/3197517.3201333, ACM Transactions on Graphics vol. 37, No. 4, Article 114, Publication Aug. 2018, pp. 114:1-114: 13 (13 pgs.).
Lai, Richard, "Oppo's under-screen camera is real and taking photos in Shanghai," https://www.engadget.com/2019-06-26-oppo-under-screen-camera-mwc-shanghai.html, Jun. 26, 2019, 8 pgs.
International Search Report and Written Opinion for International App. No. PCT/KR2020/009807, Oct. 26, 2020.
European Search Report in EP 20846484.2, Mar. 14, 2022.
Non-Final Office Action in U.S. Appl. No. 16/935,946, Apr. 5, 2022.
Notice of Allowance in U.S. Appl. No. 16/935,946, Jul. 6, 2022.
PCT Search Report and Written Decision in PCT/KR2022/001920, May 13, 2022.
Non-Final Office Action in U.S. Appl. No. 17/176,535, Mar. 7, 2022.
Yang, Hang, Zhongbo Zhang, and Yujing Guan. "An adaptive parameter estimation for guided filter based image deconvolution." *Signal Processing* 138 (Mar. 7, 2017): 16-26.
Youmaran, R., and A. Adler. "Combining regularization frameworks for image deblurring: optimization of combined hyper-parameters." In *Canadian Conference on Electrical and Computer Engineering 2004* (IEEE Cat. No. 04CH37513), vol. 2, pp. 723-726. IEEE, May 2, 2004.
Non-Final Office Action in U.S. Appl. No. 17/380,995, Jun. 22, 2022.
PCT Search Report and written decision in PCT/KR2022/001024, May 10, 2022.
Notice of Allowance in U.S. Appl. No. 16/935,946, Sep. 30, 2022.
International Search Report and Written Opinion for International Application No. PCT/KR2023/017304, Feb. 2, 2024.
Yangjie Wei et al., Blurring kernel extraction and super-resolution image reconstruction based on style generative adersarial networks, Optics Express vol. 29, Issue 26, Dec. 16, 2021.
Eric Yang, Variable Synthetic Depth of Field with Mobile Stereo Cameras, Computer Science Engineering, https://stanford.edu/class/ee367/sections 3.2, 4.3; 2020, retrieved on Jan. 9, 2024.
Soldevila F et al: "Phase imaging by spatial wavefront sampling", arxiv.org, Cornell University Library, 201 Olin Library Cornell University Ithaca, NY 14853, Nov. 11, 2017 (Nov. 11, 2017), XP081287443, DOI: 10.1364/OPTICA.5.000164, Nov. 11, 2017.
Katkovnik Vladhviir et al: "A novel binary and multilevel phase masks for enhanced depth-of-focus infrared imaging", 2018 52nd Asilomar Conference on Signals, Systems, and Computers, IEEE, Oct. 28, 2018 (Oct. 28, 2018), pp. 386-390, XP033520926, DOI: 10.1109/ACSSC.2018.8645129, Oct. 28, 2018.
European Patent Office Extended European Search Report in Application No. 228814190-1207/4327058 PCT/KR2022015641, Sep. 19, 2024.

* cited by examiner

OPTICAL ELEMENT FOR DECONVOLUTION

PRIORITY CLAIM

This application claims the benefit under 35 U.S.C. 119 of U.S. Provisional Patent Application No. 63/255,819 filed Oct. 14, 2021, the entirety of which is incorporated herein by reference.

TECHNICAL FIELD

This application generally relates to an optical element for performing deconvolution.

BACKGROUND

Electronic devices, such as mobile phones, tablet computers, smartwatches, and so forth, often include one or more image sensors, such as a camera, that can capture images. For example, a personal electronic device may include one or more cameras on the rear, or back, of the device; may include one or more cameras on the front of the device; and may include one or more cameras oriented in other arrangements on the device.

An image taken by a camera, such as by a camera of an electronic device, may be degraded (or blurred) relative to the scene represented by the image due to a number of factors, such as interactions, obstructions, etc. that occur as light from the scene travels to the camera's sensor that captures the image. Degradation may be determined or represented by point-spread functions (PSFs) that describes the response of the camera's imaging system to various point sources, and a PSF may represent an amount of blurring that is present in an image of a point source. A set of PSFs may be used to construct an un-degraded, or de-blurred, image via deconvolution.

DESCRIPTION OF EXAMPLE EMBODIMENTS

Images captured by an image sensor of an electronic device may be blurred for a variety of reasons. For example, a front-facing camera may be disposed under a display (or another surface) of a personal electronic device, for example to decrease the camera's footprint on the surface of the device and to increase the useable surface of the device. As an example, placing a front-facing camera behind a display of an electronic device may increase the size of the device's display. However, disposing the front-facing camera system behind the display panel may degrade images captured by the front-facing camera, for example because of interference caused by the display structure as light passes through the display to the camera sensor, as described more fully below.

One or more PSF measurements can be performed to characterize the degradation of an image captured by an image sensor, such as an under-display camera. Each PSF may be a function of the source's wavelength, distance, and angle with the optical axis with respect to the camera's sensor. The set of PSFs are then used to reconstruct an undegraded image via deconvolution, for example by convolving the blurred image with the inverse PSFs. The deconvolution is typically performed as a computational, numerical process by a computing device, such as by a processor of a computing device. Deconvolution calculations consume system resources, such as power, memory, and available processing capabilities, and for a device to perform deconvolution computationally the device must have the minimum capabilities, such as processing capabilities, necessary to perform the computations.

In contrast, embodiments of this disclosure perform deconvolution in the optical domain by using one or more physical optical elements designed to deblur images. The physical optical element optically performs deconvolution by manipulating the light that reaches a camera's sensor, and therefore requires little or no computation to be performed by the device in order to de-blur an image. Embodiments of this disclosure therefore reduce systems cost, computational requirements, power budget, and the time required for image reconstruction. Moreover, embodiments discloses herein enable deconvolution techniques to be performed by lightweight devices that do not have the computational resources necessary to perform deconvolution.

Figure 1:
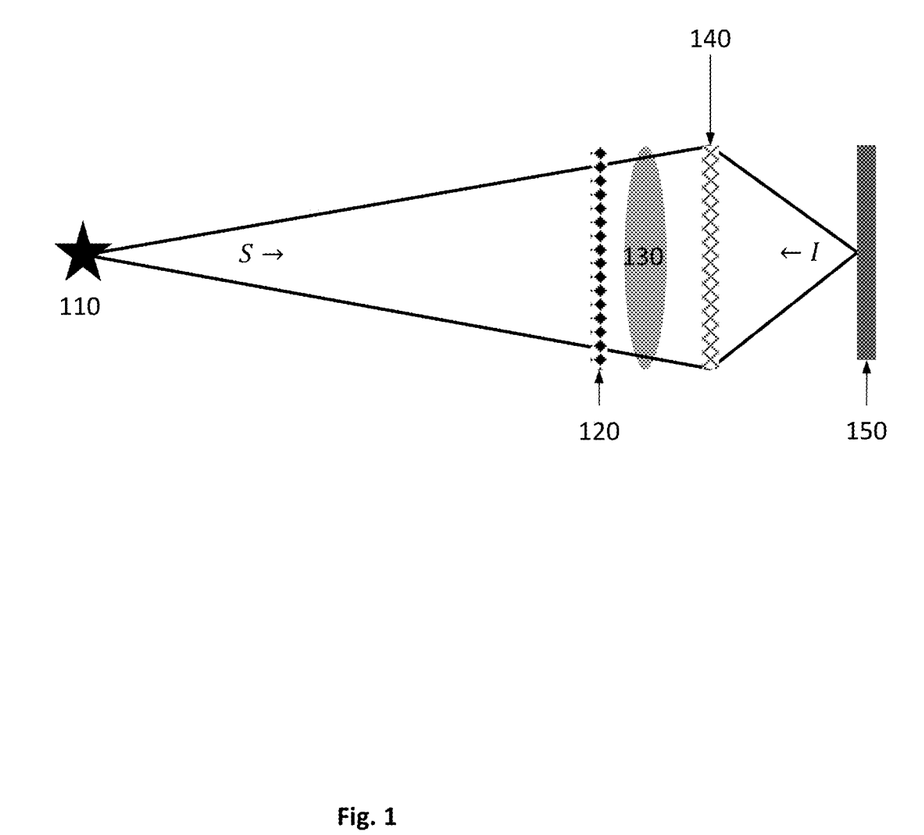
FIG. 1 illustrates an example system including an optical element that performs deconvolution.

FIG. 1 illustrates an example system including a corrective optical element that performs deconvolution. As shown in the example of FIG. 1, source 110, which may be a point source or may represent a point source, lies in an object plane and creates optical source field S. As explained more fully herein, source field S may be incoherent light comprised of many different wavelengths, e.g., wavelengths in the visible spectrum. Source field S arrives at, and is modified by, mask 120, which for example represents the layers of a physical display screen, for example a display screen of a personal electronic device, such as a mobile phone, tablet computer, smartwatch, camera, laptop, monitor, television, and so forth As shown in the example of FIG. 1, source field S passes through a transparent portion of the display screen and may interact with one or more optical components 130. For example, optical components 130 may include one or more lenses, which may be part of a camera system, that collect and focus light. While the example of FIG. 1 illustrates a single optical component 130, this disclosure contemplates that more than one optical component 130 may be present, and moreover that in some embodiments all or some optical components may be disposed prior to corrective mask 140 while in some embodiments all or some optical components may be disposed after corrective mask 140.

As shown in the example of FIG. 1, after passing through mask 120 and optical component 130, source field S reaches corrective mask 140 (also referred to herein as an "optical element" or "corrective optical element"). Corrective mask 140 interacts with and modifies source field S so that the optical field emerging from corrective element 140 is image field I. As explained more fully below, corrective mask 140 deconvolves the blurring introduced to source field S, e.g., by the display structure represented by mask 120. The resulting image field I represents a de-blurred image field, and as shown in the example of FIG. 1, de-blurred image field I is captured by image sensor 150, for example an image sensor of a camera. Thus, the resulting image captured by image sensor 150 need not be deconvolved using computational deconvolution techniques, because corrective mask 140 has physically performed the deconvolution necessary to deblur the image field so that the camera captures an already de-blurred image.

While the example of FIG. 1 relates to deconvolving an image captured by a camera that is mounted under a display of a device, this disclosure contemplates that the optical element disclosed herein may perform deconvolution in any suitable device or context. Moreover, while the example of FIG. 1 describes the camera and optical element—in the context of a personal electronic device with a display, this disclosure contemplates that the components described herein may be disposed in any suitable device that has an at least partially optically transparent surface, such as for example an appliance, mirror, etc.

Figure 2:
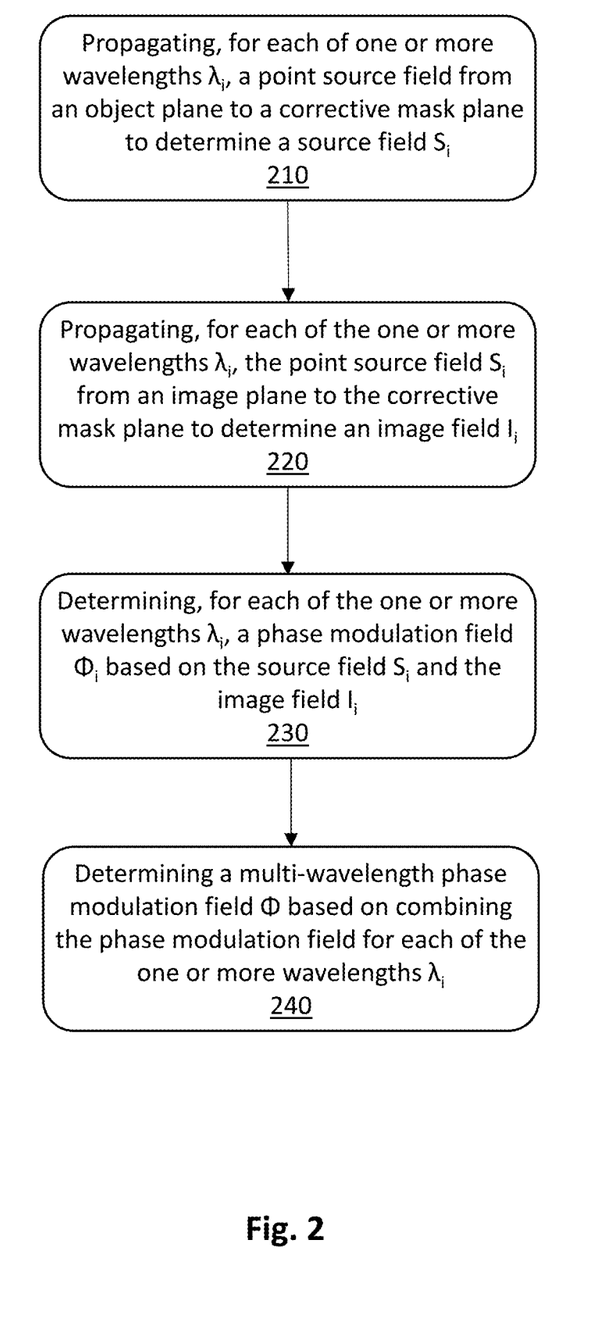
FIG. 2 illustrates an example method for creating an optical element that performs deconvolution.

FIG. 2 illustrates an example method for creating, or fabricating, an optical element that performs deconvolution, such as corrective mask 140 of the example of FIG. 1. The example method of FIG. 2 may begin at step 210, which includes propagating, for each of one or more wavelengths $\lambda_i$, a point source field from an object plane to a corrective mask plane to determine a source field $S_i$. For example, as explained above with reference to FIG. 1, point source 110 lies in an object plane, while the corrective mask plane is the plane in which corrective mask 140 lies. This disclosure contemplates that any suitable number of wavelengths $\lambda_i$ may be used to generate corresponding source fields $S_i$. For example, a set of wavelengths across the visible spectrum may be chosen, each wavelength corresponding to a source field $S_i$.

At step 220, the method of FIG. 2 includes propagating, for each of the one or more wavelengths $\lambda_i$, the point source field $S_i$ from an image plane to the corrective mask plane to determine an image field $I_i$. For example, with reference to FIG. 1, the image plane corresponds to the plane in which sensor 150 is disposed. At step 230, the method of FIG. 2 includes determining, for each of the one or more wavelengths $\lambda_i$, a phase modulation field $\Phi_i$ based on the source field $S_i$ and the image field $I_i$. For example, each phase modulation field $\Phi_i$ may be equal to $$\frac{S_i}{I_i}.$$

At step 240, the method of FIG. 2 includes determining a multi-wavelength phase modulation field $\Phi$ based on combining the phase modulation field for each of the one or more wavelengths $\lambda_i$. The combination of each $\Phi_i$ into the multi-wavelength phase modulation field $\Phi$ may be accomplished using any suitable techniques, such as for example using superposition (complex addition), random sampling, etc.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, this disclosure contemplates that some or all of the computing operations described herein, including certain steps of the example method illustrated in FIG. 2 such as steps 230 and 240, may be performed by circuitry of a computing device described herein, by a processor coupled to non-transitory computer readable storage media, or any suitable combination thereof.

The multi-wavelength phase modulation field $\Phi$ can be used to design and fabricate a physical corrective optical element, which in particular embodiments may occur after simulation studies are used to test and validate $\Phi$. A physical corrective optical element that deblurs distortion caused by, e.g., the layers of a device's display can be physically generated from the multi-wavelength phase modulation field $\Phi$ by any of a variety of different fabrication methods known in the field, including, for example binary amplitude masks, phase masks, kinoforms, freeform holographic optical elements, metalenses, etc.

Once the physical optical element is fabricated from the multi-wavelength phase modulation field $\Phi$, the optical element can be disposed in a device at the location of the corrective mask plane described above. The device can then perform image deconvolution using the fabricated optical element, without having to deconvolve the images computationally.

Figure 3:
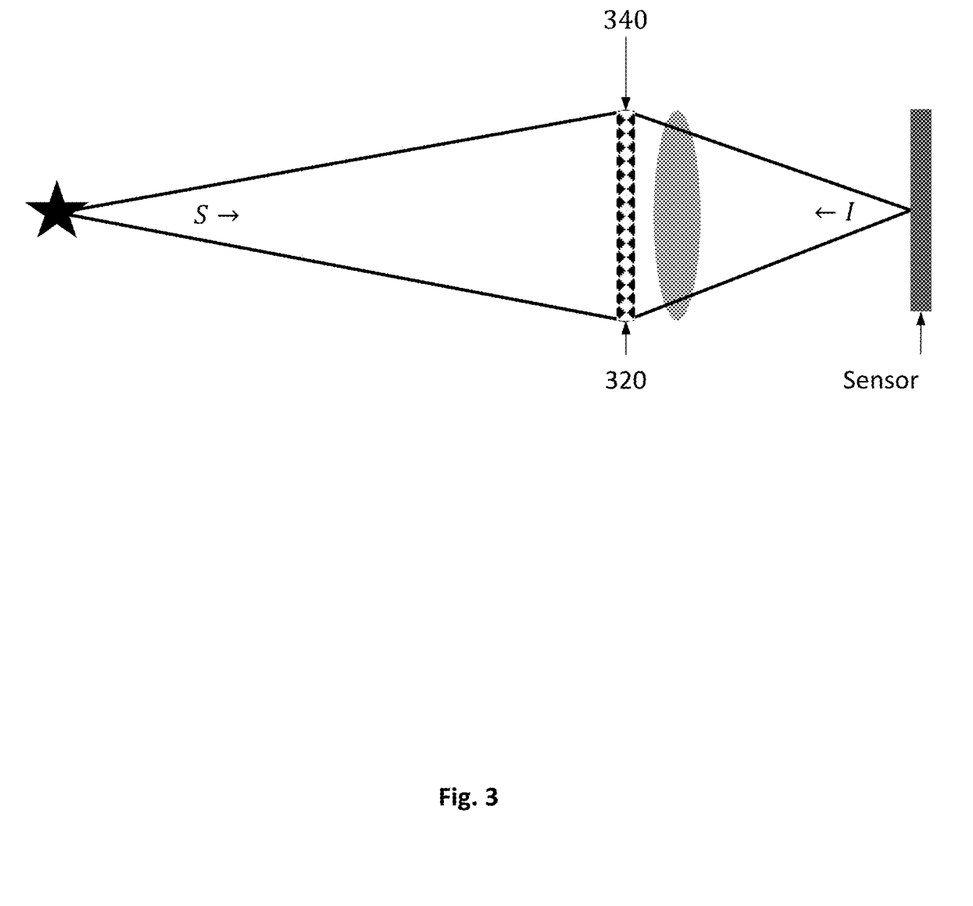
FIG. 3 illustrates another example system including an optical element that performs deconvolution.

This disclosure contemplates that a corrective optical element may be disposed in any suitable location in a device. For example, FIG. 1 illustrates an example in which the corrective optical element (correction mask 140) is disposed between a display structure (mask 120) and an image sensor 150. FIG. 3 illustrates another example where the corrective mask 340 is combined (i.e., co-located) with the display mask 320 to form a combined mask. For example, a corrective mask may be placed on the bottom of the display layers of a device.

Moreover, while examples in this disclosure relate to deconvolution and image capture of visible light, this disclosure contemplates that the optical elements described herein may be applied to other spectrums. For example, a depth sensor may sense electromagnetic waves in a spectrum that includes UV radiation or infrared radiation, or both, and an optical element may be fabricated for the depth sensor by, for example, including wavelengths in those spectrums in steps 210 and 220 of the example method of FIG. 2.

Figure 4:
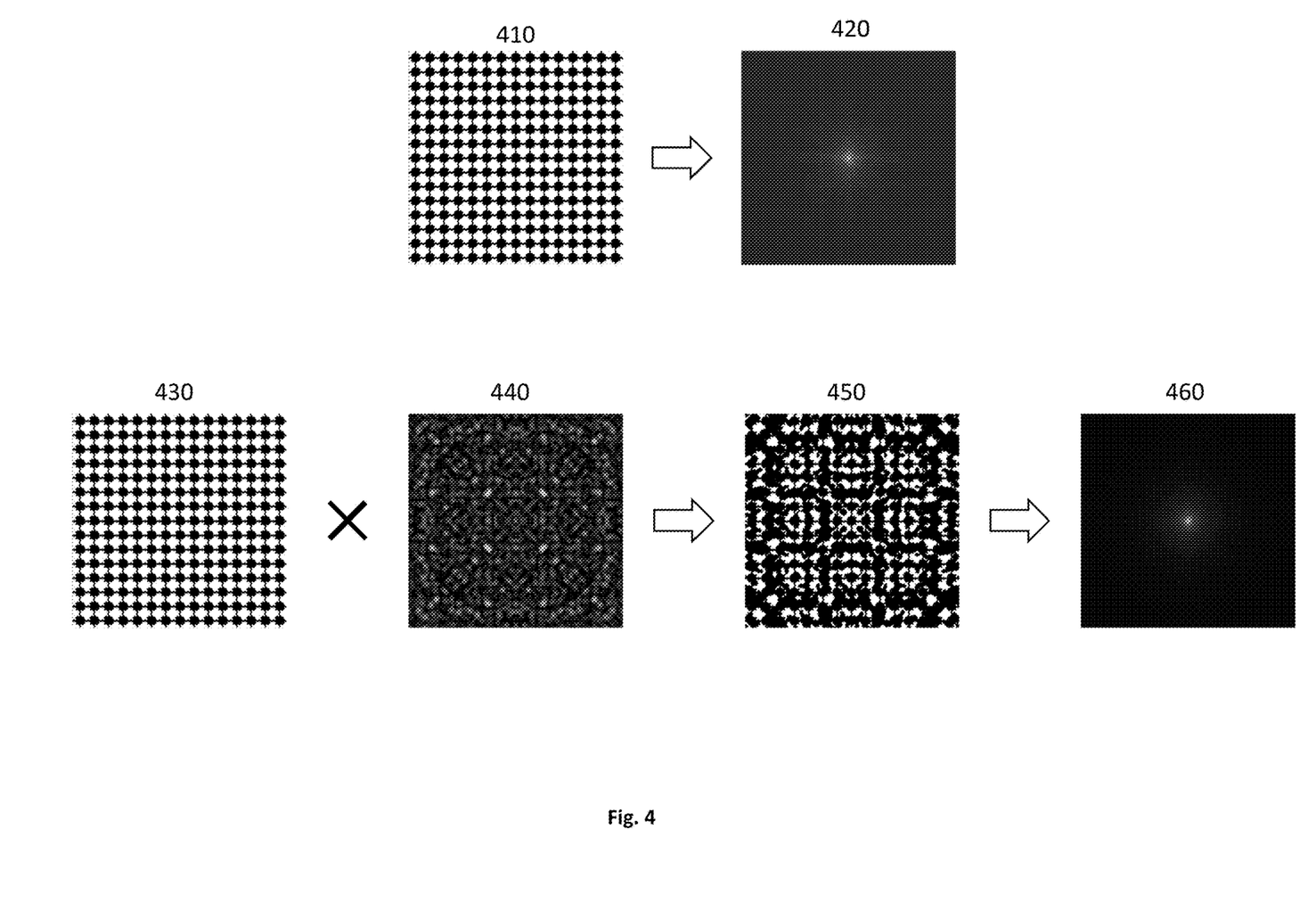
FIG. 4 illustrates an example optical response of a system using an example optical element that performs deconvolution.

FIG. 4 illustrates an example optical response of a system using a corrective optical element as described herein. FIG. 4 illustrates an example display structure mask 410, with the dark regions indicting non-transparent features of the display mask and the white regions indicating transparent (or partially transparent) regions. As a result of mask 410, light from a point source passing through mask 410 has a PSF as shown in image 420, which illustrates the blurring that display structure 410 introduces.

FIG. 4 also illustrates an example of a corrective phase mask 440, where phase modulation is partly represented by the intensity of the greyscale shown. A physical optical element can be fabricated from phase mask 440 and introduced to correct the blurring shown in image 420. For example, physical mask 450 illustrates an example where a binarized phase mask based on physical mask 440 is combined with the physical structure of display mask 430. The PSF of display mask 450 is shown in image 460, which illustrates deblurring of a point source relative to image 420 for display mask 410.

Figure 5:
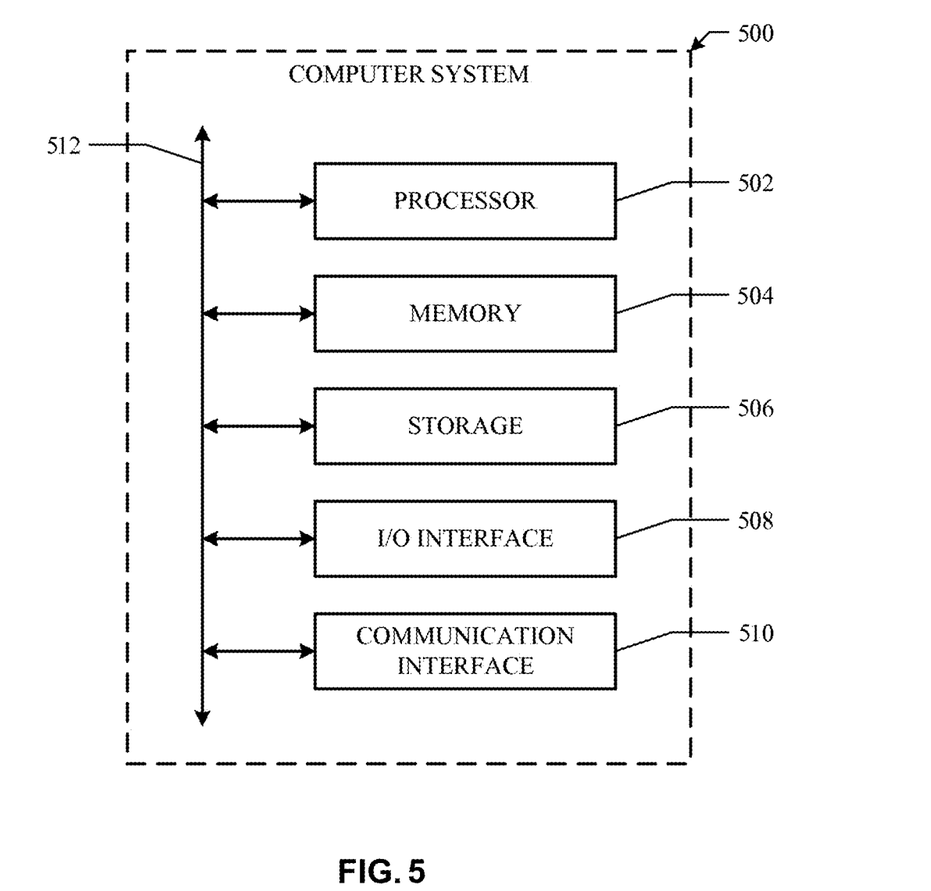
FIG. 5 illustrates an example computing device.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method of constructing a corrective phase mask for a physical corrective optical element, comprising:
    propagating, for each of one or more wavelengths, a point source field from an object plane to a corrective mask plane to determine a source field;
    propagating, for each of the one or more wavelengths, the point source field from an image plane to the corrective mask plane to determine an image field;
    determining, for each of the one or more wavelengths, a phase modulation field based on the source field and the image field;
    determining a multi-wavelength phase modulation field based on combining the phase modulation field for each of the one or more wavelengths; and
    constructing the physical corrective optical element based on the determined multi-wavelength phase modulation field to deblur distorted images without having to deconvolve the image computationally.

2. The method of claim 1, wherein the modulation field for each of the one or more wavelengths is combined based on at least one of: super-positioning or random sampling.

3. The method of claim 1, further comprising providing an optical element based on the multi-wavelength phase modulation field.

4. The method of claim 3, wherein the optical element is disposed in a computing device comprising:
a display;
an image sensor disposed behind the display; and
the optical element disposed in front of the image sensor, wherein the optical element deblurs optical blurring caused by the display.

5. The method of claim 4, wherein the optical element is disposed behind the display.

6. The method of claim 4, wherein the optical element is disposed spatially coincident with the display.

7. The method of claim 1, wherein for each of the one or more wavelengths the phase modulation field comprises the source field for that wavelength divided by the image field for that wavelength.

8. The method of claim 1, wherein the point source field from the object plane to the corrective mask plane and the point source field from the image plane to the corrective mask plane each comprise incoherent light.

9. A system comprising:
a physical corrective optical element made by a process comprising:
propagating, for each of one or more wavelengths, a point source field from an object plane to a corrective mask plane to determine a source field;
propagating, for each of the one or more wavelengths, the point source field from an image plane to the corrective mask plane to determine an image field;
determining, for each of the one or more wavelengths, a phase modulation field based on the source field and the image field;
determining a multi-wavelength phase modulation field based on combining the phase modulation field for each of the one or more wavelengths; and
fabricating the physical corrective optical element based on the multi-wavelength phase modulation field to deblur distorted images without having to deconvolve the image computationally.

10. The system of claim 9, wherein the modulation field for each of the one or more wavelengths is combined based on at least one of: super-positioning or random sampling.

11. The system of claim 9, further comprising:
a display; and
an image sensor disposed behind the display, wherein the optical element is disposed in front of the image sensor and the optical element deblurs optical blurring caused by the display.

12. The system of claim 11, wherein the optical element is disposed behind the display.

13. The system of claim 11, wherein the optical element is disposed spatially coincident with the display.

14. The system of claim 9, wherein for each of the one or more wavelengths the phase modulation field comprises the source field for that wavelength divided by the image field for that wavelength.

15. The system of claim 9, wherein the point source field from the object plane to the corrective mask plane and the point source field from the image plane to the corrective mask plane each comprise incoherent light.

16. A method comprising:
receiving, at an optical element of a device, light from an object external to the device;
modulating, by the optical element, the light from the object, wherein the modulation by the optical element deblurs blurring caused by one or more components of the device without deconvolving the light from image computationally; and
capturing, by an image sensor, the modulated light.

17. The method of claim 16, wherein the device comprises a computing device comprising:
a display;
the image sensor disposed behind the display; and
the optical element disposed in front of the image sensor, wherein the optical element deblurs optical blurring caused by the display.

18. The method of claim 17, wherein the optical element is disposed behind the display.

19. The method of claim 17, wherein the optical element is disposed spatially coincident with the display.

20. The method of claim 16, further comprising displaying, on a display of the device, an image of the object as captured by the image sensor.

* * * * *